United States Patent
Blumenthal et al.

(10) Patent No.: US 9,541,156 B2
(45) Date of Patent: Jan. 10, 2017

(54) ACTUATOR UNIT FOR MOTOR VEHICLE APPLICATIONS

(75) Inventors: Frank Blumenthal, Kempen (DE); Winfried Schlabs, Bochum (DE); Claus Töpfer, Sinderlingen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 408 days.

(21) Appl. No.: 14/127,774

(22) PCT Filed: Jun. 21, 2012

(86) PCT No.: PCT/DE2012/000644
§ 371 (c)(1),
(2), (4) Date: Mar. 17, 2014

(87) PCT Pub. No.: WO2013/000454
PCT Pub. Date: Jan. 3, 2013

(65) Prior Publication Data
US 2014/0217748 A1 Aug. 7, 2014

(30) Foreign Application Priority Data
Jun. 30, 2011 (DE) ........................ 10 2011 107 634

(51) Int. Cl.
| | |
|---|---|
| H02K 7/08 | (2006.01) |
| F16F 15/08 | (2006.01) |
| B60N 2/02 | (2006.01) |
| E05B 81/24 | (2014.01) |
| H02K 5/24 | (2006.01) |
| H02K 7/116 | (2006.01) |
| E05C 1/06 | (2006.01) |

(52) U.S. Cl.
CPC ............. *F16F 15/08* (2013.01); *B60N 2/0232* (2013.01); *E05B 81/25* (2013.01); *E05C 1/06* (2013.01);
(Continued)

(58) Field of Classification Search
CPC ........ F16F 15/08; B60N 2/0232; E05B 81/25; E05C 1/06; H02K 5/24; H02K 7/081; H02K 7/1166; Y10T 292/1021
(Continued)

(56) References Cited

U.S. PATENT DOCUMENTS 1,688,891 A    10/1928 Spreen
3,584,469 A *  6/1971 Butts ..................... F25D 17/065
                                                    310/51
(Continued)

FOREIGN PATENT DOCUMENTS

DE    100 19 572 A1   10/2001
DE    101 31 590 A1    1/2003
(Continued)

OTHER PUBLICATIONS

International Search Report for corresponding patent application No. PCT/DE2012/000644 dated Jun. 12, 2012.

*Primary Examiner* — Burton Mullins
(74) *Attorney, Agent, or Firm* — Renner, Otto, Boisselle & Sklar, LLP

(57) ABSTRACT

The subject matter of the present invention is an actuator unit for motor vehicle applications, in particular motor vehicle door locks (1). This actuator unit has in its basic design a housing (8a, 8b), in addition a drive (2) which is arranged in the housing (8a, 8b), an actuator element (3, 4) which can be acted on by the drive (2), and at least one rubber bearing (10) for the drive (2). According to the invention, the housing (8a, 8b) is equipped with mounting projections (15) which are arranged distributed on the circumference of the rubber bearing (10), in the region of a rubber bearing mount (16).

14 Claims, 3 Drawing Sheets

Figure 1:
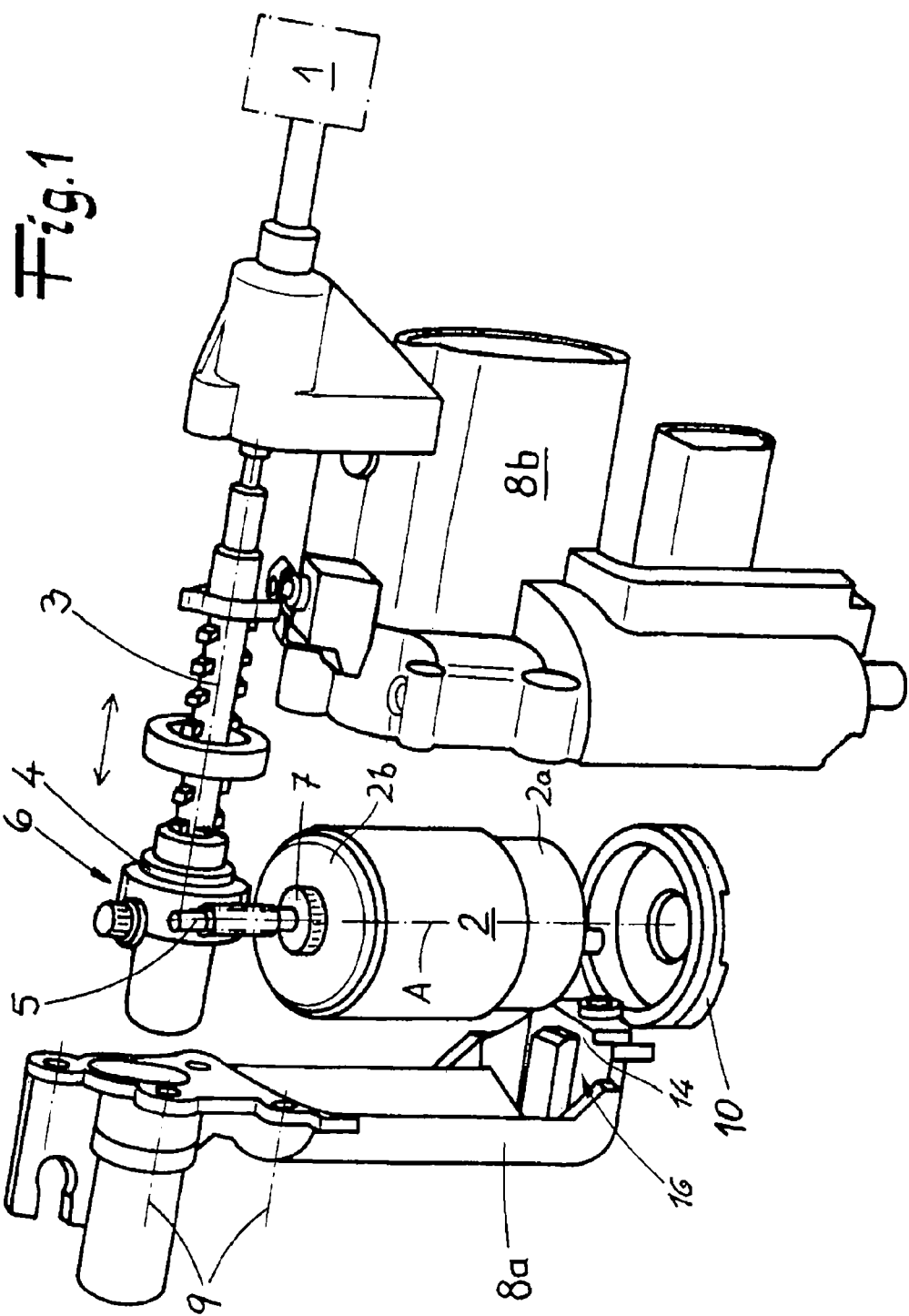

(52) U.S. Cl.
CPC ............... *H02K 5/24* (2013.01); *H02K 7/081* (2013.01); *H02K 7/1166* (2013.01); *Y10T 292/1021* (2015.04)

(58) Field of Classification Search
USPC .......................................................... 310/51
See application file for complete search history.

(56) References Cited

U.S. PATENT DOCUMENTS

| | | | | |
|---|---|---|---|---|
| 4,257,634 A | * | 3/1981 | Kleefeldt | ................ E05B 81/25 292/201 |
| 5,165,867 A | * | 11/1992 | Dockery | ............. F02M 37/103 417/360 |
| 5,394,039 A | * | 2/1995 | Suchdev | .................. H02K 5/24 173/162.2 |
| 5,397,950 A | * | 3/1995 | Norbury, Jr. | ............. H02K 5/24 310/51 |
| 5,482,444 A | * | 1/1996 | Coha | .................... F02M 37/106 248/638 |
| 6,262,504 B1 | | 7/2001 | Bartlett | |
| 2004/0032177 A1 | * | 2/2004 | Nitzsche | .................. H02K 5/24 310/91 |

FOREIGN PATENT DOCUMENTS

| | | |
|---|---|---|
| DE | 10 2009 036835 A1 | 2/2011 |
| EP | 1 453 181 A2 | 9/2004 |

* cited by examiner

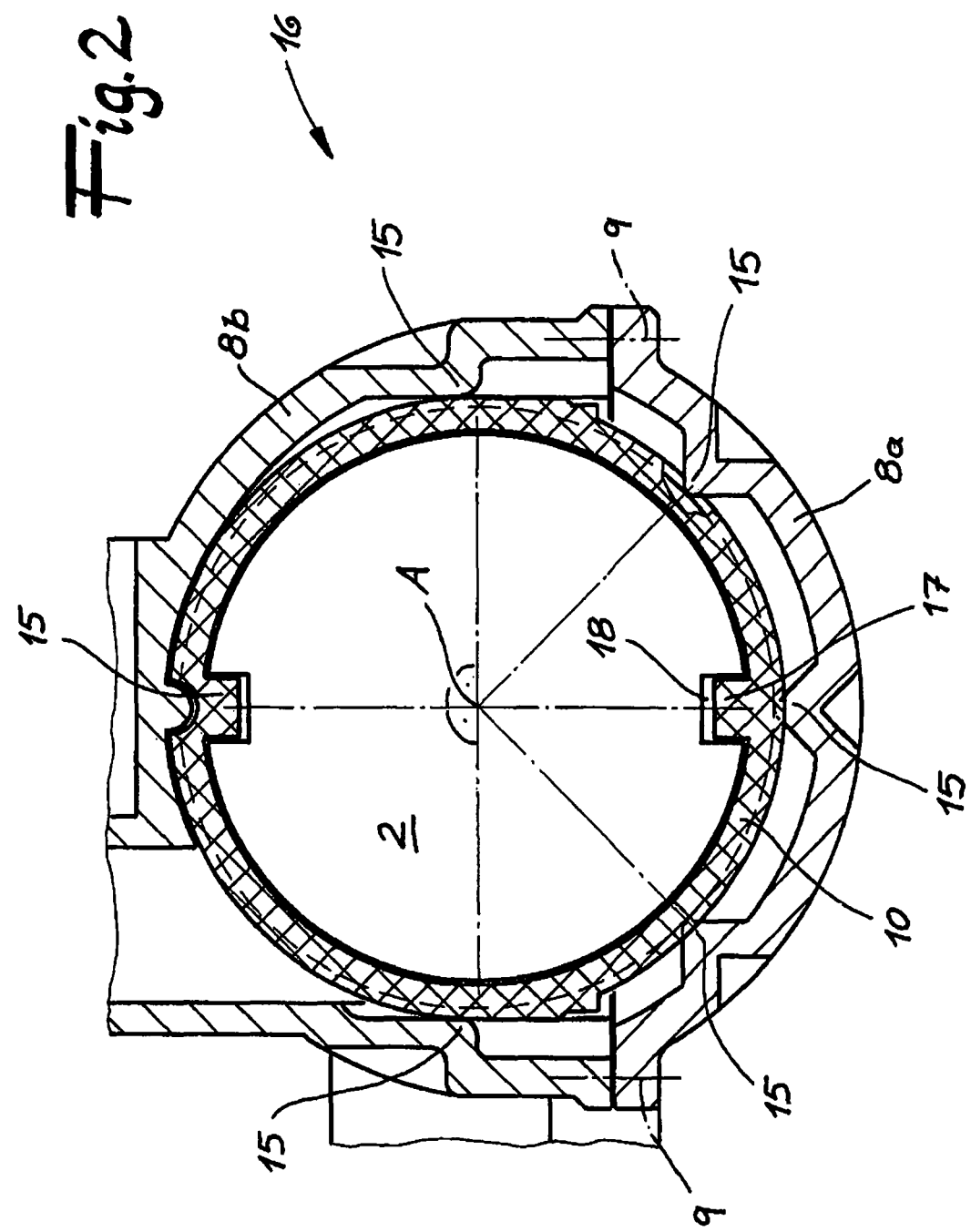

ACTUATOR UNIT FOR MOTOR VEHICLE APPLICATIONS

The invention relates to an actuator unit for motor vehicle applications, in particular for vehicle door locks, containing a housing and a drive arranged in the housing, an actuator element acted upon by the drive and at least one rubber bearing for the drive.

An actuator unit of the aforementioned design is disclosed in DE 10 2009 036 835 A1 of the applicant. At this point the actuator element is indeed a linear actuator element used for acting upon a closing means. The closing means can be of a design disclosed in DE 101 12 120 B4.

In DE 10 2009 036 835 A1 the rubber bearing primarily serves to accommodate and surround a floor of the drive designed as an electric motor. Apart from this rubber bearing, the drive also contains a press bearing seat. This ensures that the rotation movement provided by the drive at its drive shaft is correctly and accurately transferred to the actuator element without virtually any vibrations. As disclosed in DE 10 2009 036 835 A1, the actuator element can be a spindle nut drive, which serves as an example but does not limit the invention in any way.

DE 101 31 590 A1 discloses a means for attaching an electric motor, in which the motor is a fan motor. In this embodiment, the accommodating housing contains at least a resilient holding element for axial fixing.

U.S. Pat. No. 6,262,504 B1 discloses a motor and a respective covering housing, in which a rubber bearing is used again at this point.

The generic state of the art according to DE 10 2009 036 835 A1 as well as also the last two non-generic documents are restricted by the fact that the housing accommodating the drive is inaccurately manufactured. This can result in incompatibilities during transfer of the rotary motion of the drive onto a gear or on an actuator element acted upon by the drive. Inaccuracies at this point actually cause the gear or the drive to make excessive noise and/or to suffer increased wear. The invention aims to remedy this.

The invention is based on the technical problem of further developing such an actuator unit for motor vehicle applications in such a way that the noise generated and the alignment of the motor to the gear is optimized and that the system does not or hardly ever malfunction.

In order to solve this technical problem, a generic actuator unit of the invention is characterized by the housing containing mounting projections which are arranged distributed along the circumference of the rubber bearing in the region of a rubber bearing mount.—The rubber bearing mount in turn serves as a retaining device for the rubber bearing. The rubber bearing in turn provides the bearing of the drive.

Generally, the rubber bearing mount of the housing contains three or more mounting projections, although in principle two mounting projections suffice. In most cases the mounting projections are at least partly arranged evenly around the circumference of the rubber bearing in the housing in the area of the rubber bearing mount. It has also proven to be advantageous for the mounting projections to be preferably designed so that they can be manually reworked.

To allow manual reworking of the mounting projections, at least the mounting projections must be made from an easily (manually) processable material. Plastic has proven to be particularly advantageous, allowing manual reworking with a knife, a file or other grinding tools in an effortless and quick manner.

It has also proven to be advantageous if the mounting projections are arranged on the housing in such a way that no undercuts are produced. Indeed designs generally provide for the mounting projections to be injection molded together with the housing. In other words, the housing and the mounting projections provided in the rubber bearing mount are produced in one injection molding step, using the same tool. In this context, plastic injection molding has proven to be particular advantageous. The mounting projections can indeed each be designed as radial projections. These projections are thus formed in radial direction of the housing and are raised in the rubber bearing mount compared to the housing centre or the centre of the mostly circular rubber bearing mount. Such a design of the mounting projections as radial projections can be easily and cheaply produced in a housing as an injection molded plastic part in a (single) respective injection molded work piece.

The mounting projections in the rubber bearing mount, interacting with the rubber bearing as disclosed in the invention, first of all achieve that the drive is supported in the rubber bearing mount in the area of the mounting points with the assistance of the rubber bearing. These mounting points are defined by the mounting projections. As the mounting projections and thus the mounting points are distributed along the circumference of the rubber bearing, the rubber bearing is securely held in position and typically in axial and radial direction. Axial fixing can also be provided by the rubber bearing. The rubber bearing does, however, mainly serve to secure the radial position, allowing a tolerance compensation in relation to the gear.

The mounting points of the rubber bearing inside the rubber bearing mount of the housing can also be used to easily compensate for positional tolerances between the drive and, for instance, a downstream gear or the following actuator element. As an example, one or more mounting projections—as described—can be easily reworked in order to eliminate any inaccuracies in the alignment of the drive in relation to the actuator element or a downstream gear. In any case, the mounting projections regularly provide a radial fixing of the rubber bearing and thus of the drive as well as a radial tolerance compensation. There is also the option to use the mounting projections to provide and achieve axial alignment and fixing of the rubber bearing and thus of the drive.

To achieve this, the rubber bearing can be designed as a pot-shaped rubber bearing ring. Advantageously the rubber bearing ring also has a wave-like shape at its circumference and in axial direction in its cross section. Due to the wave-like shape the rubber bearing ring contains several grooves or notches in axial direction, arranged in succession to each other. These individual grooves or notches in axial direction of the rubber bearing ring interact as mounting indentations with the mounting projections on the housing. The grooves allow easy axial alignment of the drive in relation to the housing, using the interposed rubber bearing ring. This is also aided by the fact that the drive and the rubber bearing ring are generally rotationally symmetric. In most cases the drive and the rubber bearing ring have a common rotationally symmetric axis, regularly coinciding with the drive shaft of the drive, designed as an electric motor.

The rubber bearing or the rubber bearing ring contains at least on its drive side or motor side, i.e. on the surface facing the motor or the drive, a shape engaging in the recess of the motor. The fact that the shape on the rubber bearing or rubber bearing ring engages in the recess of the motor, provides an overall rotation-proof bearing of the drive in relation to the rubber bearing or the electric motor inside the pot-shaped rubber bearing ring.

In addition, mounting recesses corresponding to the mounting projections are provided on the projection side on the rubber bearing. These mounting recesses can be the aforementioned grooves arranged in succession in axial direction and which all cover the entire circumference of the pot-shaped rubber bearing ring. By engaging in the respective mounting recesses on the projection side of the rubber bearing, the mounting projections provide a rotation-proof fixing. Using this rotation-proof fixing, the rubber bearing or the pot-shaped rubber bearing ring are secured in relation to the housing. Fixing can be in radial as well as in axial direction.

As already explained, the mounting recesses are located on the projection side or on the outside of the rubber bearing in the form of grooves extending in axial direction. They secure the rubber bearing as well as the drive in axial direction. The mounting recesses or grooves can also have a limited extension in the direction of the circumference. This also radially secures the rubber bearing or the pot-shaped rubber bearing ring and thus the drive in relation to the housing or its rubber bearing mount.

The rubber bearing can also contain at least one axial extension. This axial extension generally engages in an axial recess in the housing to provide a secure axial positioning of the rubber bearing and thus of the motor. The axial extension can contain one or several apertures through which, for instance, connecting cables to the drive can pass. In most cases, the axial extension is an extension of a motor shaft or drive shaft of the drive and is connected to the rubber bearing. In other words, the axial extension can be arranged at the centre or also off-centre in relation to the rubber bearing or the pot-shaped rubber ring.

The base or bottom-side of the drive or the predominantly cylindrical electric motor is generally inserted in the pot-shaped rubber bearing ring. Opposite to the base, the drive shaft of the electric motor protrudes at the head end in relation to its cylindrical housing. The drive shaft interacts with the actuator element or an upstream gear. Due to the radial and axial fixing or secure positioning of the electric motor provided by the rubber bearing of the invention together with the mounting projections in the area of the rubber bearing mount, serving as mounting points, a single mounting of the drive generally suffices. In addition, mounting facilities can be provided on the head of the electric motor in the area around the drive shaft.

Despite of the several grooves successively arranged in axial direction on the outside or projection side of the pot-shaped rubber bearing ring and the wavy cross section, the rubber bearing ring has an overall cylindrical basic shape. The grooves or notches as well as the elevations located between them can actually have an individual or common trapezoidal cross section. This is, of course, only an example and is not mandatory.

As a result, the invention provides an actuator unit for motor vehicle applications and in particular for vehicle door locks, which is in particular suitable for combining with two closing means as described in detail in the generic DE 10 2009 036 835 A1 or DE 101 12 120 B4 referred to therein. The bearing of the drive in combination with the specially designed inventive pot-shaped rubber bearing ring for the drive or electric motor ensures in this context, that motor vibrations of the drive can be easily absorbed and attenuated by the rubber bearing. The rubber bearing also ensures that motor noise is eliminated. In this context it has proven to be particularly advantageous that any positional tolerances between the drive and a downstream gear or the following actuator element, can easily be compensated for. This is, in particular, aided by the circumstance that the mounting projections can be reworked, where necessary to provide support points for the rubber bearing ring inside the rubber bearing mount. In this way tolerances can still be compensated for during production. These are the main advantages of the invention.

Figure 4:
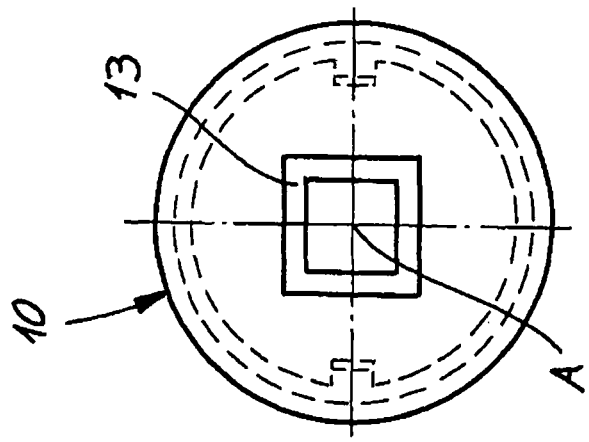
Figure 3:
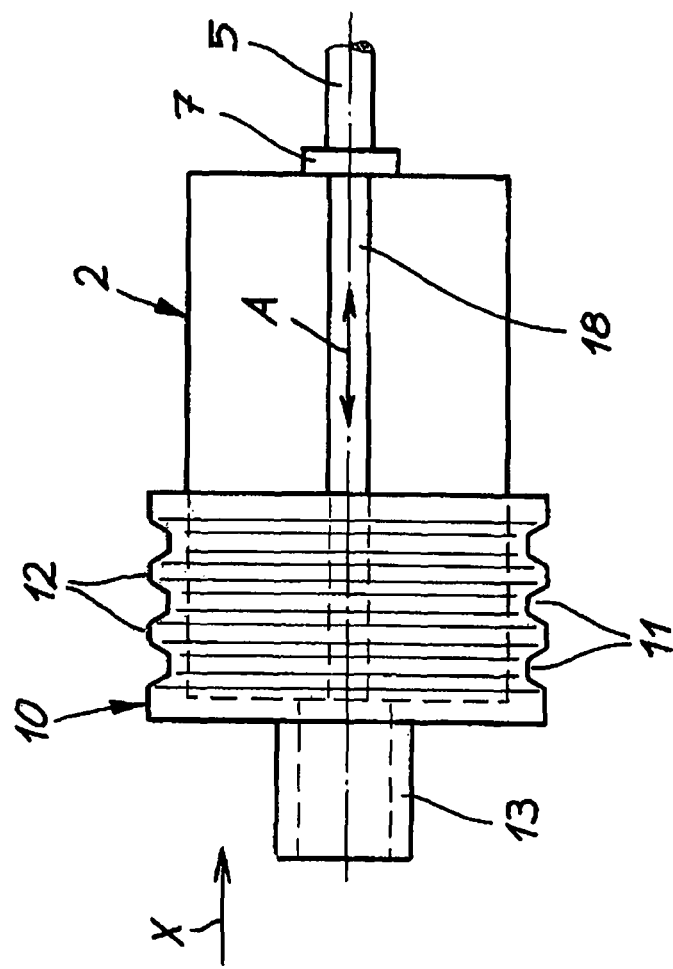

Below, the invention is explained in detail with reference to a drawing showing only one embodiment, in which:

FIG. 1 shows a schematic exploded view of the actuator unit of the invention, FIG. 2 shows a section through the object of FIG. 1 in the area of the rubber bearing, FIG. 3 shows a side view of the drive including rubber bearing and FIG. 4 shows a view of the object of FIG. 3 from direction X.

The figures show an actuator unit for motor vehicle applications. In automotive applications the shown example provides an actuating function in connection with one or several vehicle door locks 1, although the invention is not limited to this. The shown actuator unit can actually be used for acting upon a closing means of such a motor vehicle door lock 1 in the way disclosed in DE 101 12 120 B4. This is naturally only an example and the invention is not limited to this.

In order to provide the described actuating movement or acting upon the closing device in a motor vehicle door lock 1 in detail, the general design of the actuator unit contains a drive 2 and an actuator element 3, 4, designed in this case as a linear actuator element 3, 4.

The actuator element or the linear actuator element 3, 4 is acted upon by the drive 2 in order to activate the closing means on the motor vehicle door lock 1.

In addition, a housing 8a, 8b is provided. The drive 2 is accommodated or positioned in the housing 8a, 8b. The linear actuator element 3, 4 as such comprises a spindle drive with a threaded spindle 3 and a spindle nut 4 arranged in the housing 8a, 8b on ball or slide bearing. The drive or electric motor 2 has a drive shaft 5.

Using a worm gear 6, the drive shaft 5 transfers its rotation movements onto the linear actuator element 3, 4 or the spindle nut 4. As a result the firmly mounted spindle nut 4 is rotationally displaced and moves the spindle or threaded spindle 3 mounted on the spindle nut 4 to and fro, depending on its direction of rotation, as indicated by the double arrow in FIG. 1. A Bowden cable connected to spindle 3 or a comparable connecting element then transfers the linear actuating movements of the linear actuator 3, 4 onto the motor vehicle door lock 1 or the closing means contained therein, in the example.

The drive or the electric motor 2 may be connected to the housing 8a, 8b via a bearing point 7. The housing 8a, 8b actually contains two parts. It mainly consists of a cover section 8a and a top section 8b. Connecting elements 9 can be used to connect the two housing sections 8a, 8b.

Apart from the bearing point 7, which is generally dispensable, the invention also provides a rubber bearing 10 for the drive 2. In the example embodiment, the rubber bearing 10 is a pot-shaped rubber bearing ring 10. The base 2a of the drive 2 is inserted in the pot-shaped rubber bearing ring 10. In contrast, the rubber bearing ring 10 does not engage with the middle section of the drive 2 or its head 2b. The drive shaft 5 protrudes from the head 2b of the drive 2, acting on the worm gear 6 as described.

In the example embodiment the drive 2 is an electric motor 2, in particular a DC motor. From FIG. 3 it is apparent that the predominantly cylindrical rubber bearing ring 10 has a wave-shaped circumference and cross section when viewed in axial direction A. In the example embodiment both the rubber bearing ring 10 and the drive 2 do in fact have an overall rotational symmetrical design in relation to a common rotational axis of symmetry A, also specifying the axial direction A. The drive shaft 5 is arranged on the rotational axis of symmetry A.

Due to the wave-shaped cross section of the rubber bearing ring 10 at its circumference in axial direction A, grooves or notches 11 and elevations 12 alternate. In fact, several grooves or notches 11 are successively arranged in axial direction A. The same applies for the elevations 12. The grooves or notches 11 and/or elevations 12 can have a trapezoidal cross section. As a result, the rubber bearing ring 10 has an overall cylindrical shape.

Lastly, an axial projection 13 is provided at the rubber bearing ring 10. This axial projection 13 is located at the centre of the rotational axis of symmetry A in comparison to the cylindrical and pot-shaped rubber bearing ring 10. In the assembled state of the rubber bearing ring 10, the axial extension 13 engages in an axial recess 14 in the housing. As a result, the rubber bearing ring and thus the drive 2 seated in the rubber bearing ring 10 are fixed in axial direction. The axial extension 13 is located in the extension of the drive shaft 5 of drive 2.

Of special significance for the invention is the circumstance that the housing 8a, 8b contains mounting projections 15 distributed along the circumference of the rubber bearing or rubber bearing ring 10 and which are provided in the area of a rubber bearing mount 16. The rubber bearing mount 16 is located inside the housing 8a, 8b and in the area of the housing 8a, 8b in which the rubber bearing or the rubber bearing ring 10 is positioned in its installed state. The rubber bearing mount 16 as such has the shape of a circular ring. In the shown example, the centre of the circular ring coincides with the rotational axis of symmetry A which is naturally not mandatory.

The sectional view of FIG. 2 through housing 8a, 8b in the area of the rubber bearing mount 16 shows that at least two mounting projections 15, generally three or more mounting projections 15 and, according to the example embodiment six mounting projections 15 are provided in the area of the rubber bearing mount 16 of the housing 8a, 8b. The individual mounting projections 15 are at least partially arranged evenly around the circumference of the rubber bearing 10.

The three mounting projections 15 are in fact positioned at an arch distance of approx. 90°, whilst the other three mounting projections 15 each span an arc angle of 45°. Naturally this only serves as an example.

The individual mounting projections 15 act as support points or mounting points for the rubber bearing or the rubber bearing ring 10. The rubber bearing 10 or the rubber bearing ring 10 is selectively supported by the mounting projections 15 and is seated at the mounting projections 15 in the rubber bearing mount 16 inside the housing 8a, 8b. In this way the drive or electric motor 2 seated in the rubber bearing ring 10 is provided with a respective tolerance compensation. Indeed, not only does the rubber bearing 10 absorb and eliminate motor vibrations and motor noises, but the mounting projections 15 also allow compensation of any positional tolerances between the drive 2 and the actuator element 3, 4 or the upstream gear or worm gear 6. For this purpose individual or all mounting projections 15 can be manually reworked. This is particularly easy, precise and quick, due to the fact that the housing 8a, 8b as a whole is designed as an injection-molded housing and preferably as a plastic injection molded housing.

The mounting projections 15 can indeed be formed together with the housing 8a, 8b in one step. The mounting projections 15 are also injection molded together with the housing 8a, 8b.

Mounting recesses 11 on the projection side of the rubber bearing 10 correspond to the mounting projections 15 on the housing 8a, 8b or in the area of the rubber bearing mount 16. The mounting recesses 11 on the projection side, i.e. on the surface of the rubber bearing 10 facing the mounting projections 15, are the already described grooves or notches 11 in the embodiment. These grooves or notches 11 can be located on the circumference of the rubber bearing 10 or may only cover a limited radial arch angle compared to axial direction A. In the latter case the engaging of the mounting projections 15 in the respective groove or notch 11 results in a radial fixing of the rubber bearing 10 in relation to the housing 8a, 8b.

The grooves or notches 11 also ensure—irrespective of whether they extend around the entire circumference or are provided only along a limited arch angle—as a whole and in addition an axial fixing of the rubber bearing 10. This is due to the fact that the mounting projections 15 can only engage in the grooves or notches 11 between the elevations 12 in axial direction A, resulting in the already described axial fixing of the rubber bearing 10. The mounting recesses 11 on the projection side on the rubber bearing 10 corresponding to the mounting projections 15 thus produce an assembled anti-rotation design for the rubber bearing 10 in relation to the housing 8a, 8b. This applies in any case in the event that the groves or notches 11 only cover a respectively limited arch angle. In any case, axial fixing of the rubber bearing 10 is achieved with the aid of the grooves or notches or the mounting recesses 11 as well as possibly radial fixing.

In order to also be able to secure the drive or electric motor 2 in addition to the rubber bearing 10, the rubber bearing 10 also contains at least one contour 17 on the motor or drive side i.e. on the surface facing the drive 2. This contour 17 engages in a recess 18 of the drive or motor 2. In this way, the drive or electric motor 2 is secured against rotation in and in relation to the rubber bearing 10.

Finally, the already mentioned axial extension 13 engages in axial recess 14 when the rubber bearing 10 is inserted in the housing 8a, 8b. In this way, the drive or electric motor 2 surrounded by or accommodated in the rubber bearing 10 is provided with a radial rotation-proof mounting and is also axially aligned. This is due to the fact that the axial extension has a multi-edged cross section and engages in the correspondingly designed axial recess 14. This is of particular significance to ensure that the drive shaft 5 of the electric motor 2 can accurately mesh with the worm gear 6. Also, the rubber bearing 10 is fixed axially and radially in the housing 8a, 8b.

At the same time, the axial extension 13 on the rubber bearing 10 can be provided with an aperture—not expressly shown—through which one or several supply cables for the drive or electric motor 2 can pass. In the example embodiment, the axial extension 13 as such is designed as an open hollow cube towards the inside or in the direction of the drive 2. Naturally said extension could also have a cylindrical shape which is also covered by the invention.

The invention claimed is:

1. Actuator unit for a motor vehicle having a door lock, the actuator unit comprising:
   a housing;
   a drive arranged in the housing;
   an actuator element acted upon by the drive for operating the door lock; and
   at least one rubber bearing engageable between the housing and the drive, the rubber bearing retaining a base portion of the drive,
   wherein the housing includes mounting projections that are spaced from one another and arranged along an engaging surface between the housing and the rubber bearing, and
   wherein the rubber bearing includes a plurality of mounting recesses that are arranged in an axial direction and engageable with the mounting projections,
   wherein the rubber bearing is configured as a cylindrical rubber bearing ring and the rubber bearing ring has a wave-shaped cross section in an axial direction at a circumference of the rubber bearing ring.

2. Actuator unit according to claim 1, wherein three or more mounting projections are provided in the housing.

3. Actuator unit according to claim 1, the mounting projections are equidistantly spaced along the circumference of the rubber bearing.

4. Actuator unit according to claim 1, wherein the mounting projections are shaped as part of the housing, wherein the housing is a continuous body.

5. Actuator unit according to claim 1, wherein the mounting projections are injection molded together with the housing.

6. Actuator unit according to claim 1, wherein the rubber bearing includes mounting elevations adjacent to the mounting recesses, the mounting recesses and/or elevations being provided on radially outward side of the rubber bearing to produce an assembled anti-rotation means for the rubber bearing in relation to the housing.

7. Actuator unit according to claim 1, wherein, on a radially inward side, the rubber bearing contains at least one contour engaging in a recess of the drive to ensure a rotation-proof mounting of the drive in the rubber bearing.

8. Actuator unit according to claim 1 further comprising at least one axial projection that extends from the rubber bearing in an axial direction, abutting a support surface and/or an axial recess in the housing to ensure an axial position of the rubber bearing.

9. Actuator unit according to claim 8, wherein the axial projection is provided as an extension of the drive.

10. Actuator unit according to claim 1, wherein the base of the drive is inserted in the rubber bearing ring.

11. Actuator unit according to claim 1, wherein the mounting recesses include several grooves or notches that are successively arranged in the axial direction.

12. Actuator unit according to claim 1, wherein the drive and the rubber bearing are rotationally symmetrical in relation to a common rotational axis of symmetry.

13. Actuator unit for motor vehicle applications for motor vehicle door locks, with a housing and a drive arranged in the housing, an actuator element which can be acted upon by the drive and with at least one rubber bearing for the drive, wherein the housing is equipped with mounting projections distributed along a circumference of the rubber bearing in a region of a rubber bearing mount, wherein the rubber bearing cylindrical in shape, the mounting projections being circumferentially spaced apart, wherein the rubber bearing ring has a wave-shaped cross section in an axial direction at the circumference of the rubber bearing ring.

14. Actuator unit according to claim 13, further comprising several grooves or notches that are successively arranged in the axial direction, wherein the several grooves or notches are adjacent to the mounting projections.

* * * * *